(12) United States Patent
Morein (10) Patent No.: US 7,091,971 B2
(45) Date of Patent: Aug. 15, 2006

(54) SYSTEM, METHOD, AND APPARATUS FOR MULTI-LEVEL HIERARCHICAL Z BUFFERING

(75) Inventor: Stephen L. Morein, Cambridge, MA (US)

(73) Assignee: ATI Technologies, Inc., Markham (CA)

( * ) Notice: Subject to any disclaimer, the term of this patent is extended or adjusted under 35 U.S.C. 154(b) by 383 days.

(21) Appl. No.: 10/279,902

(22) Filed: Oct. 25, 2002

(65) Prior Publication Data

US 2003/0151606 A1    Aug. 14, 2003

Related U.S. Application Data

(60) Provisional application No. 60/330,675, filed on Oct. 29, 2001.

(51) Int. Cl.
*G06T 15/40* (2006.01)

(52) U.S. Cl. ............. 345/422; 345/428; 345/583; 345/585

(58) Field of Classification Search .......... 345/422, 345/428, 583, 585
See application file for complete search history.

(56) References Cited

U.S. PATENT DOCUMENTS

| | | | |
|---|---|---|---|
| 4,914,589 A | 4/1990 | Crawford | |
| 5,777,619 A | 7/1998 | Brinsmead | |
| 5,793,375 A | 8/1998 | Tanaka | |
| 5,854,631 A * | 12/1998 | Akeley et al. | 345/419 |
| 6,222,552 B1 * | 4/2001 | Haas et al. | 345/422 |
| 6,421,764 B1 | 7/2002 | Morein | |
| 6,480,205 B1 | 11/2002 | Greene | |
| 6,492,987 B1 | 12/2002 | Morein | |
| 6,636,215 B1 * | 10/2003 | Greene | 345/422 |

OTHER PUBLICATIONS

S. Morein, "ATI Radeon—HyperZ technology," Hot3d Session of 2000 Eurographics Workshop on Computer Graphics Hardware, Aug. 2000.*

U.S. Appl. No. 60/188,052, filed Oct. 21, 2003, Greene.

* cited by examiner

*Primary Examiner*—Kimbinh T. Nguyen
*Assistant Examiner*—Ahmed Elkassabgi
(74) *Attorney, Agent, or Firm*—Hartman Patents PLLC (57) ABSTRACT

A secondary representative Z value memory includes a reduced-resolution representation of a primary representative Z value memory. Upon updating of a block of the primary representative Z value memory, one or more corresponding values are calculated for updating the reduced-resolution representation.

26 Claims, 13 Drawing Sheets

SYSTEM, METHOD, AND APPARATUS FOR MULTI-LEVEL HIERARCHICAL Z BUFFERING

RELATED APPLICATIONS

This application claims the benefit of U.S. Provisional Patent Application No. 60/330,675, filed Oct. 29, 2001 and entitled "SYSTEM, METHOD, AND APPARATUS FOR MULTI-LEVEL HIERARCHICAL Z BUFFERING."

RESERVATION OF COPYRIGHT

The disclosure of this patent document contains material that is subject to copyright protection. The copyright owner has no objection to the facsimile reproduction by anyone of the patent document, or of the patent disclosure as it appears in the United States Patent and Trademark Office patent files or records, but otherwise reserves all copyright rights whatsoever.

BACKGROUND OF THE INVENTION

1. Field of the Invention

The present invention relates to video graphics processing.

2. Background Information

Computers are used in many representational and interactive applications. As computing systems continue to evolve, their graphical display requirements become more stringent. These requirements are especially demanding in the field of three-dimensional (3D) video graphics processing.

Figure 1:
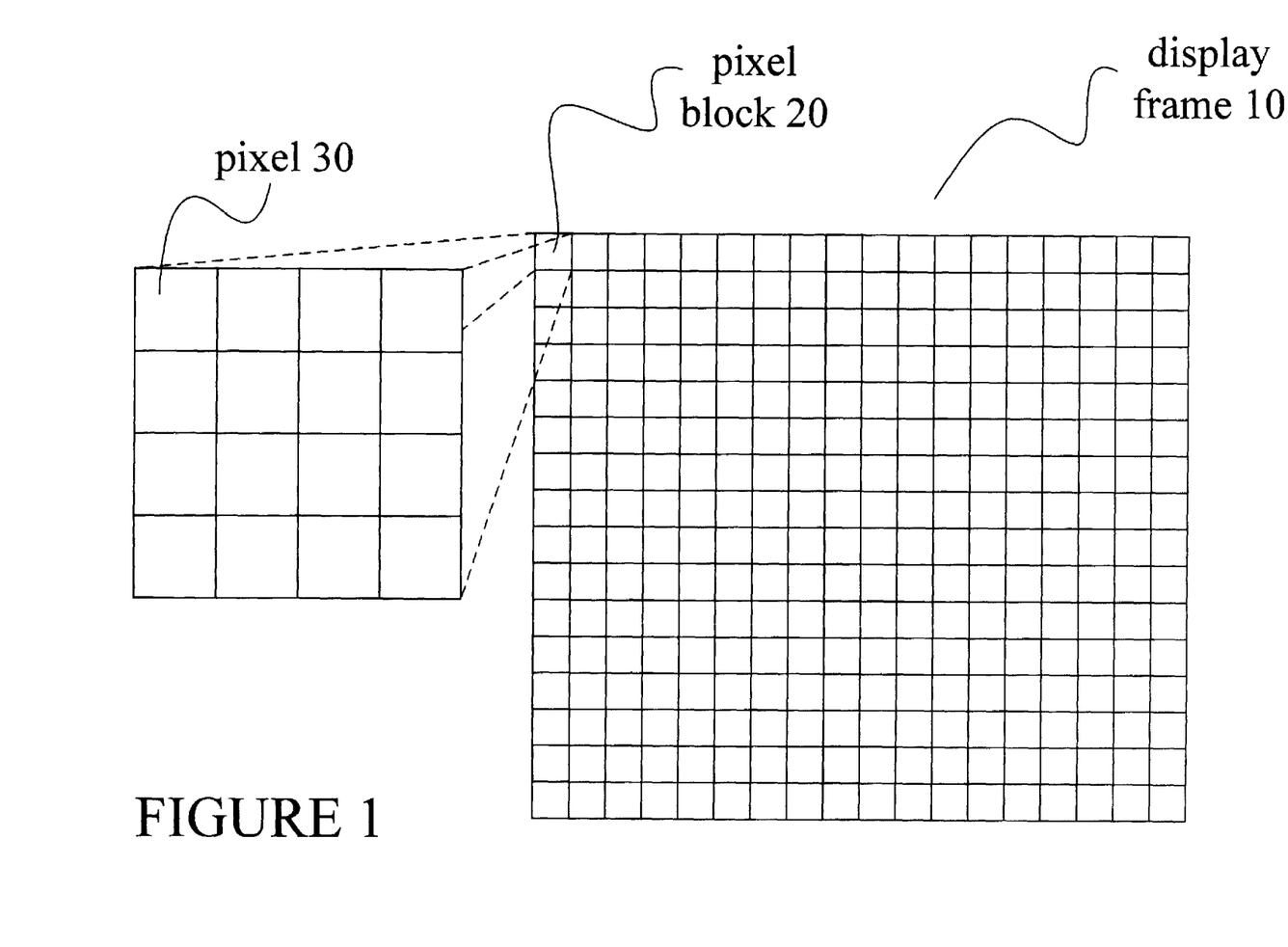
FIG. 1 illustrates a division of a display frame into pixel blocks and pixels.

In 3D graphics rendering, an image of a 3D rendering space is presented on a display frame as if the space is being viewed through a two-dimensional display plane. As shown in FIG. 1, the display frame 10 is an array of individual picture elements (or 'pixels') 30. For efficiency in processing and/or storage, display frame 10 may be divided into pixel blocks 20. For consumer applications, typical sizes for a display frame include 640×480, 800×600, 1024×768, 1152×864, 1280×1024, and 1600×1200 pixels.

Each pixel represents a sample of the display plane at a specified location and may include one or more pixel values, such as a color value that corresponds to the color of the rendering space as viewed through the display plane at that location, an opacity value (also called an alpha value), and a depth value (also called a Z value, where the display plane is defined as a particular X-Y plane in an XYZ coordinate space). A color value of a pixel may further include multiple subvalues: for example, red, green, and blue values in a RGB colorspace; or hue, saturation, and intensity values in a HSV colorspace.

In a 3D surface rendering scheme, three-dimensional 'wire frame' models of objects in the rendering space are constructed using graphics primitives (e.g. triangles or other elemental polygons). Each primitive is defined by a set of vertices that have values relating to location (e.g. in the rendering space), quality (e.g. color, opacity, and/or texture), and/or lighting (e.g. direction of surface normal).

A 3D graphics architecture receives the vertices (e.g. from a software application) and converts them to fragments, whose color values are accumulated into a frame buffer that represents the display frame. Computer displays and other high-resolution display devices, such as high-definition televisions (HDTVs), projectors, printers, and the like, present the contents of the frame buffer to a viewer. The pixels are closely spaced, and the viewer's visual system performs a filtering of the individual pixels to form a composite image. If an image is properly partitioned into pixels that are sufficiently close together, the viewer perceives the displayed array as a virtually continuous image.

Depth information is important to the 3D rendering process, as an object that is entirely opaque will occlude those portions of other objects that lie behind it with respect to the viewpoint. As the positions of the vertices with respect to the display plane include the spatial dimension of depth within the rendering space (also referred to as the Z-dimension), objects may be drawn in front of or behind one another in overlapping (or occluding) fashion.

In order to correctly render an object model, each fragment should be tested for occlusion before its values are incorporated into a corresponding pixel. To support occlusion testing, a 3D graphics architecture includes a Z buffer that holds the Z values of the pixels of the image in the frame buffer. If the Z value of a fragment indicates that the fragment is occluded by an existing opaque surface in the image, then the fragment will not be visible and the corresponding pixel should not be updated in the frame buffer.

Considerable memory bandwidth is consumed in retrieving and updating Z buffer values. Memory traffic due to Z buffer use may be reduced by caching Z values locally (e.g. as described in U.S. Pat. No. 6,421,764). Additionally, upon a cache miss, the backmost Z value among a cache line block marked for replacement may be selected as a representative Z value for the block and stored into a representative Z value memory (or 'hierarchical Z buffer'). Implementation of a representative Z value memory, and use of such a memory for object-element level processing determinations, are described in U.S. Pat. No. 6,492,987.

It is desirable to maintain a representative Z value memory close to the graphics processing hardware, even on the same chip if possible. Although the size of this memory is reduced in comparison with the Z buffer, it may still be quite large, consuming a significant amount of chip area and thus reducing the area available for processing elements and/or increasing fabrication costs by requiring an increased die size.

DETAILED DESCRIPTION

Figure 2:
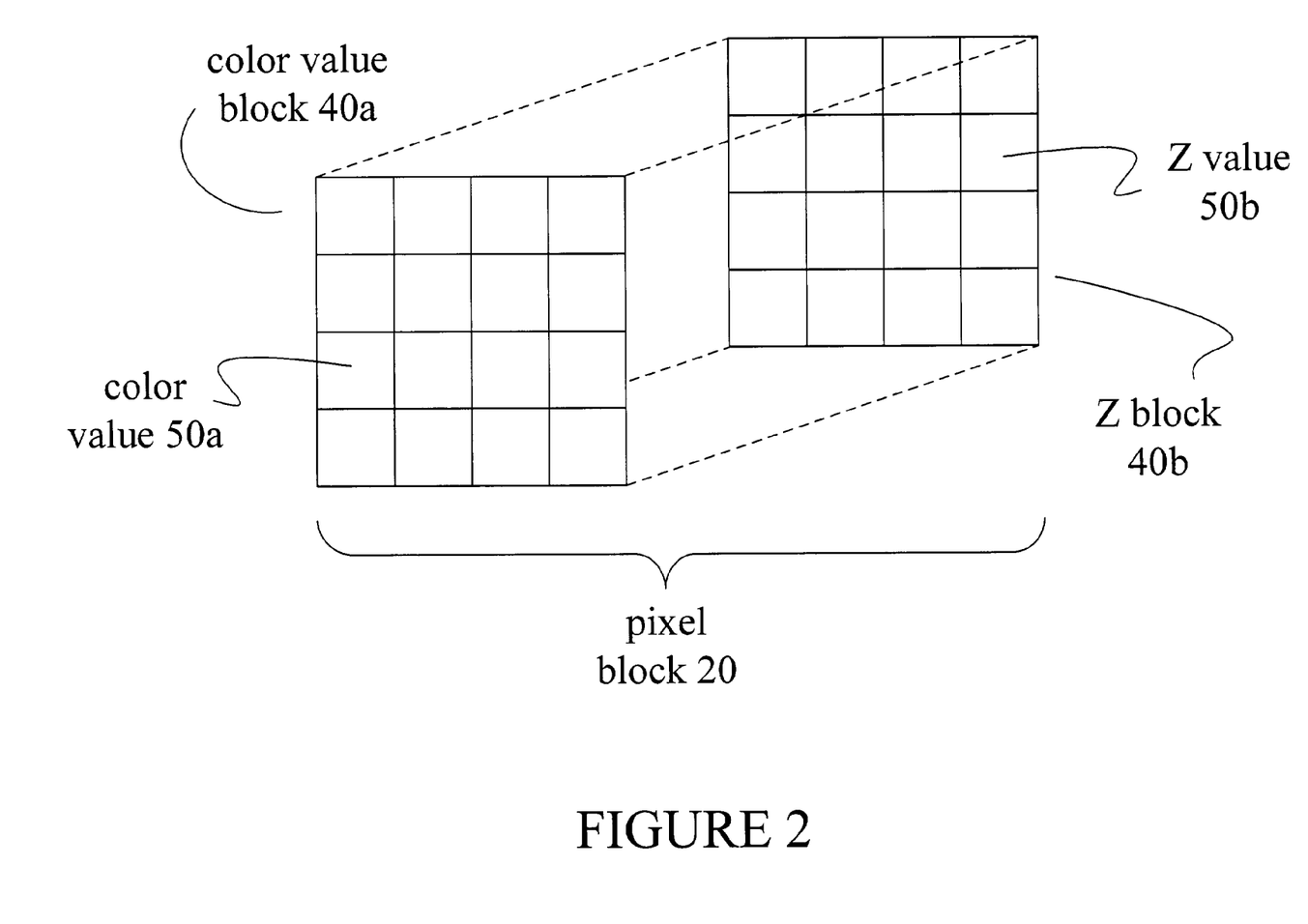
FIG. 2 illustrates a pixel block including color values and Z values.
Figure 3:
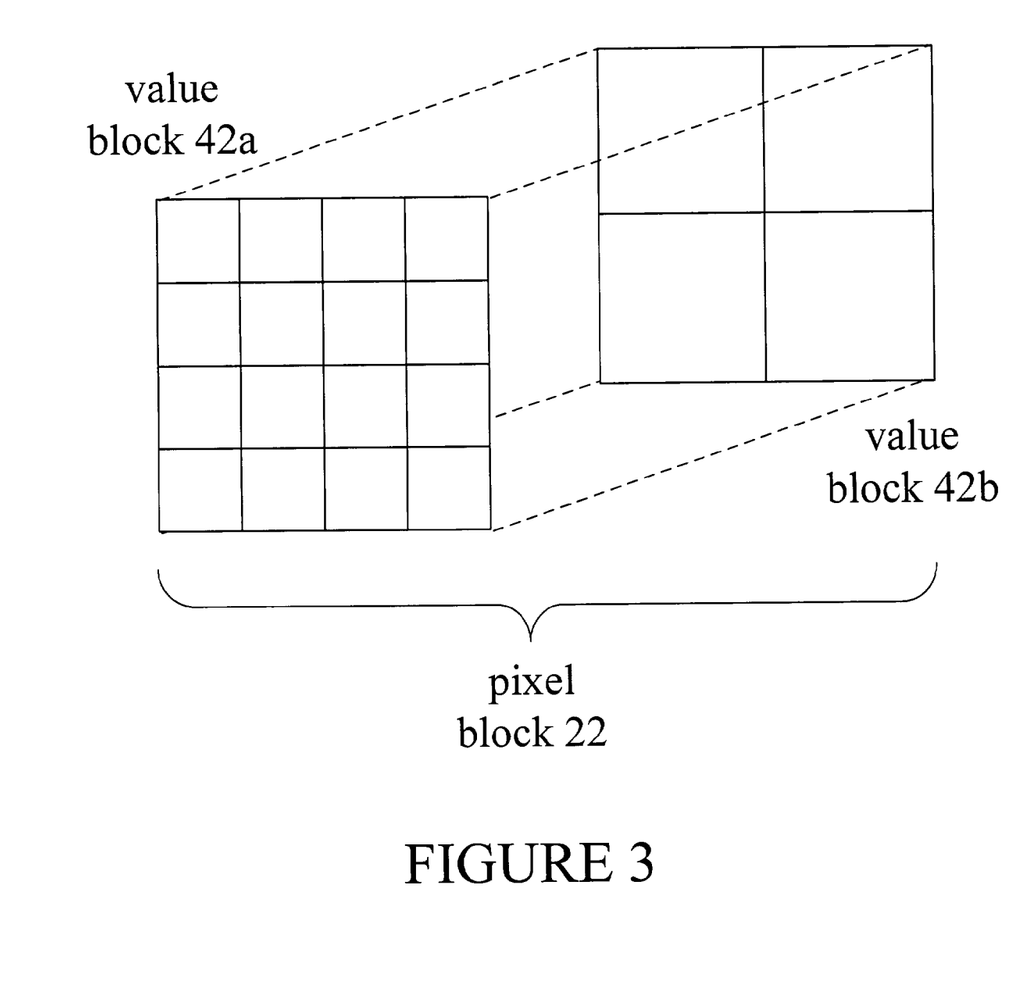
FIG. 3 illustrates a pixel block 22 including value blocks having different numbers of values.

The various values of a pixel may be stored separately and may also be processed separately (e.g. at different stages of the display process). In one example, as discussed herein and as illustrated in FIG. 2, a pixel block 20 includes a color value block 40a and a Z value block (or 'Z block') 40b, with one value 50 in each of blocks 40a and 40b for each pixel 30. In other cases, it is possible for the division of the display frame into pixel values to differ among the various value spaces (for example, the number of values in a color value block and a Z block may differ). As shown in FIG. 3, a value in a block 42a in one value space (e.g. a Z block) may correspond to more than one value in a block 42b in another value space (e.g. an opacity block). Therefore, it is possible for the number of values in a display frame to differ depending on the value space.

The number of values 50 in a value block 40 may be selected based on such factors as the size of the display frame in pixels, the width of a datapath (e.g. a memory bus) in the graphics system, or the nature of a compression algorithm employed to compress values. In a system having a 128-bit memory bus and 32-bit Z values 50b, for example, it may be desirable to transfer no less than four Z values [4×32 bits=128 bits] per transaction, so that a Z block 40b may be configured to have a multiple of four values. In FIG. 1, pixel block 20 is shown to contain 4×4 (or 16) pixels, so four memory bus transactions would be required in this system to transfer a Z block 40b associated with pixel block 20 across the memory bus. Many other configurations are possible: for example, a pixel block may contain 8×8 pixels.

Although FIGS. 1–3 depict pixel blocks 20 as square, the division of a display frame into pixel blocks may be performed in any other manner that is efficient with respect to a particular application (e.g. in light of such factors as instruction set architecture, datapath width, and storage or tiling format). For example, blocks that are rectangular and/or interleaved may be used, or blocks of differing shapes and/or sizes may be distributed throughout a display frame. It may also be desirable to alter the division scheme over time (e.g. from one display frame to the next).

Hereinafter, it is assumed that Z values have a length of 32 bits, although the length of Z values may depend upon the architecture employed in a particular graphics system (e.g. 16-bit values may also be used). In a system that includes a stencil buffer, a portion of each Z value may be reserved for use in stenciling operations such as shadow processing (e.g. eight of 32 bits, or one of 16 bits, may be reserved for one or more stencil values). It is also possible for multiple Z values to be stored for each pixel 30 (e.g. in a system that applies oversampling techniques). As discussed herein, pixels that are farther away from the viewpoint have higher Z values than pixels that are closer, although other orientations of the Z-axis are also possible.

Figure 4:
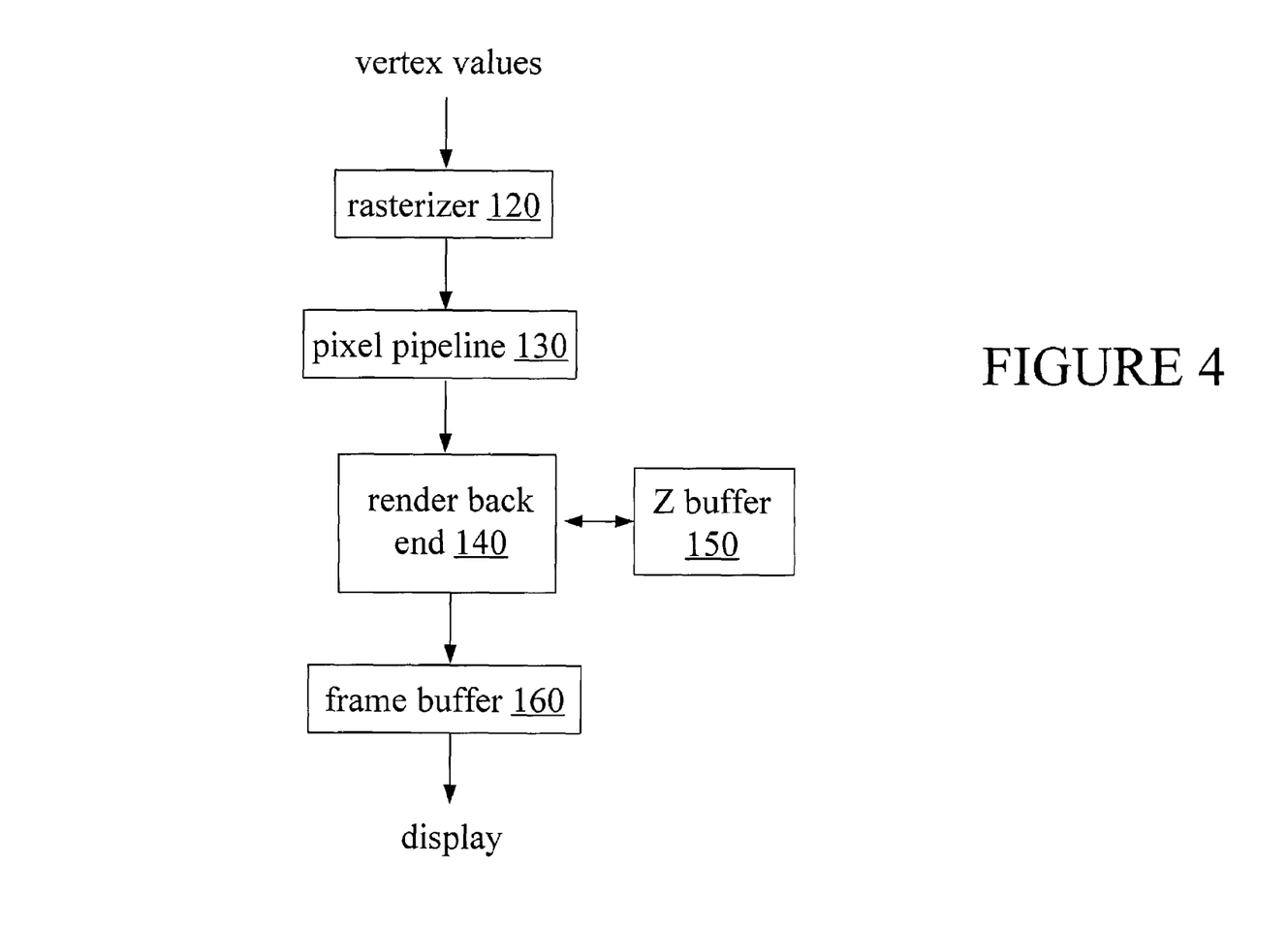
FIG. 4 shows a block diagram of a 3D graphics architecture.

FIG. 4 shows a block diagram for a 3D video graphics architecture. Such an architecture may be implemented in a video graphics card for use in a personal computer (e.g. a card having a connector to interface with the computer's PCI or AGP bus). Alternatively, at least a portion of the architecture may be implemented on a chip package that is integrated into a computer mainboard.

Figure 5:
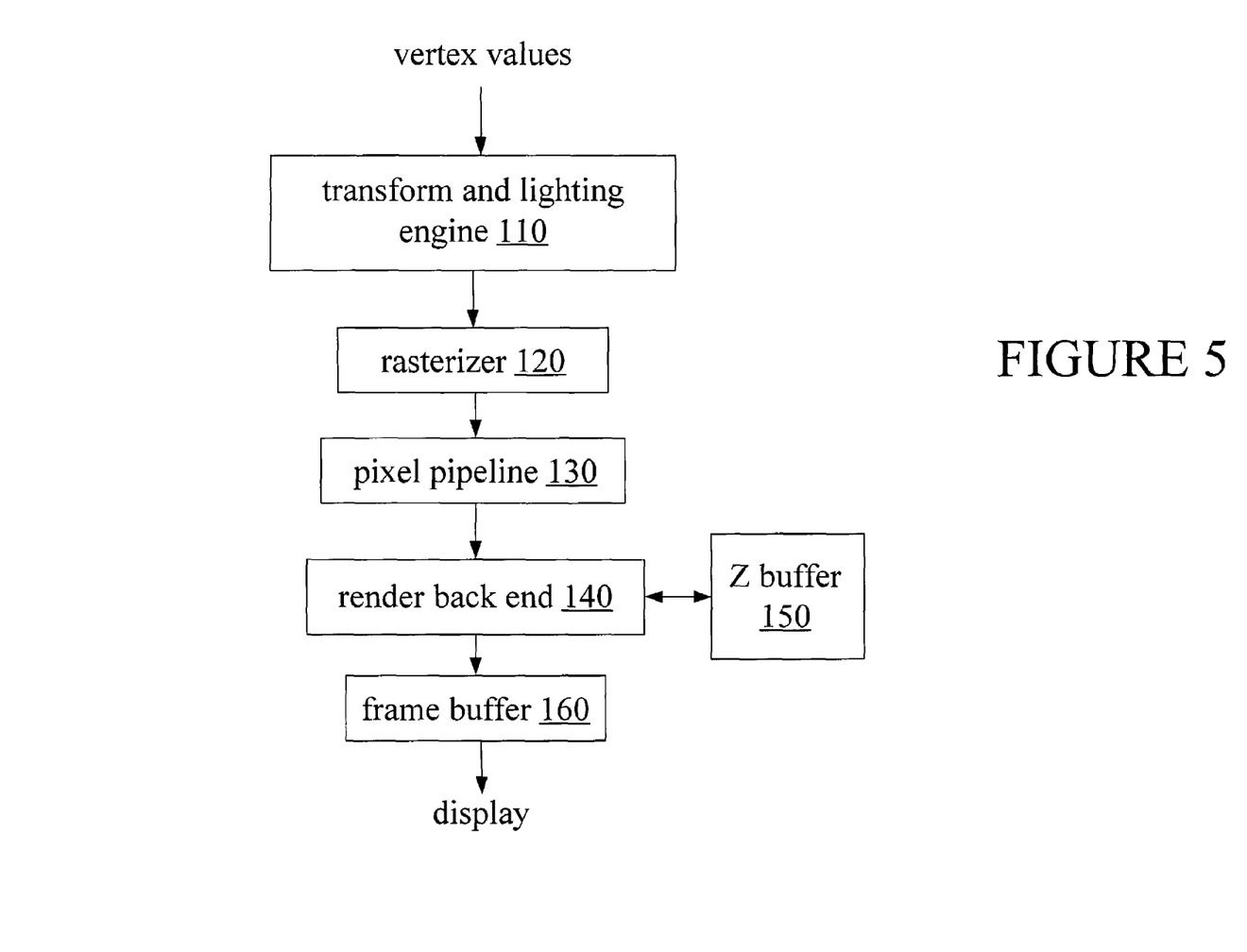
FIG. 5 shows a block diagram of a 3D graphics architecture.

Rasterizer 120 receives a set of graphics primitives for each of the objects to be rendered in a scene. In this example, rasterizer 120 receives each primitive as a triangle having vertices as described above. Rasterizer 120 may receive the primitives from a software application such as a game, simulator, or other 3D imaging application. Alternatively, as shown in FIG. 5, rasterizer 120 may receive the primitives from a transform and lighting engine 110, which may perform coordinate transform and/or lighting operations on the primitives. Rasterizer 120 converts the primitives into fragments, each fragment being a bundle of values to update a particular pixel of display frame 10 as represented in a frame buffer 160. The fragment values may indicate a corresponding location in the rendering space as well as corresponding locations in one or more texture, lighting, or environment maps.

Rasterizer 120 forwards the fragments to a pixel pipeline 130, where their values may be modified by operations such as smoothing, blending, dithering, transparency processing, and texture and bump mapping. The particular operations that pixel pipeline 130 performs on a fragment may depend upon the current configuration of the pipeline (e.g. as defined by the current values of a set of pipeline state variables).

Render back end 140 receives the fragments from pixel pipeline 130 and discards fragments or incorporates fragment values into frame buffer 160 according to the results of one or more culling tests. For example, render back end 140 may perform an occlusion test (or 'Z-test') by comparing a Z value of the fragment to a value of Z buffer 150 that corresponds to the same pixel.

Z buffer 150 stores a corresponding Z value for each pixel in the display frame. For example, Z buffer 150 may store the frontmost of the Z values of the fragments incorporated into the corresponding pixel. Render back end 140 compares the Z value of each incoming fragment to the Z value of the corresponding pixel in Z buffer 150. If the fragment is occluded (i.e. the fragment has a Z value greater than the buffered value), then the Z-test fails. In this case, the fragment is not to be added to the frame buffer, the corresponding value in Z buffer 150 is not updated, and the failure may also be reported to other hardware and/or software components for further action. If the fragment has a Z value that is smaller than the buffered value, then the Z-test succeeds. In this case, the fragment may be written to the frame buffer (possibly pending the outcomes of further tests) and the corresponding value in Z buffer 150 is updated with the Z value of the fragment. When all of the objects to be rendered have been rasterized and incorporated into the display buffers, the contents 6f frame buffer 160 are modulated onto a display signal (not shown).

Because the Z buffer is typically too large to store locally, buffered values must be retrieved from storage [e.g. from onboard random-access memory (RAM) or from system RAM]. It may be efficient to retrieve Z values in blocks rather than individually. For example, Z blocks may be stored in a local Z cache, where each cache line stores a mapped Z block and fragment Z values are compared with corresponding cached values. If the fragment is not occluded, the cached value is updated, and updated values are written back into the Z buffer upon a cache miss.

Because objects are rendered successively, the same block in the Z buffer may be retrieved and tested many times for each rendered frame, and supporting the Z-test may therefore require a great deal of data transfer. If data cannot be transferred from the Z buffer in an efficient manner, the Z-test may become a bottleneck in the rendering process, degrading rendering performance and/or producing results that are untimely and without practical value.

Figure 6:
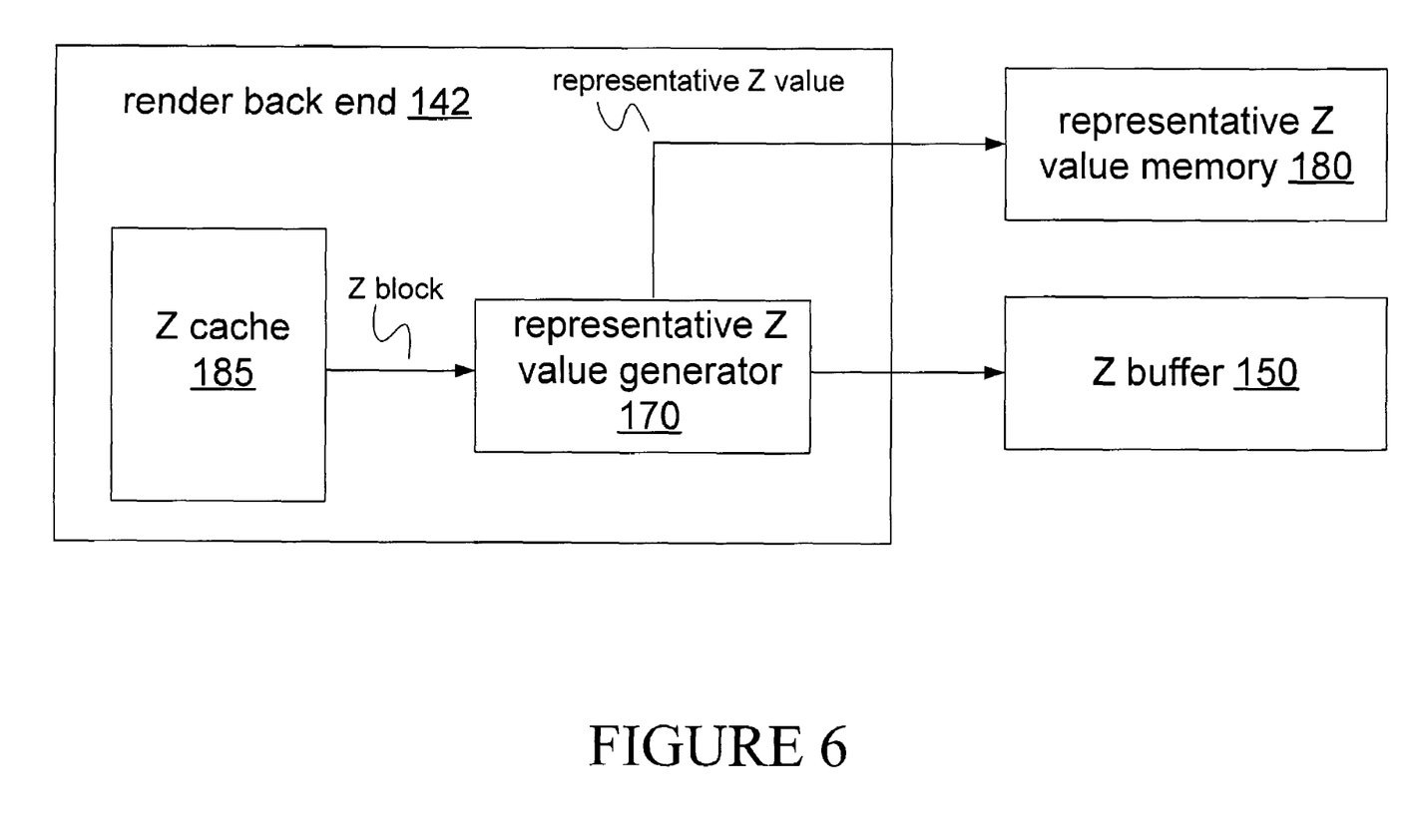
FIG. 6 shows a block diagram of a Z value storage system.

FIG. 6 shows a block diagram of a Z value storage system of a 3D graphics architecture that includes Z buffer 150, a render back end 142, and a representative Z value memory 180. Z cache 185 stores one or more Z blocks for Z testing. When a cache miss occurs and the Z block selected for replacement is written back to Z buffer 150, representative Z value generator 170 determines the backmost Z value of the block being written back and updates a corresponding location of representative Z value memory 180.

Figure 7:
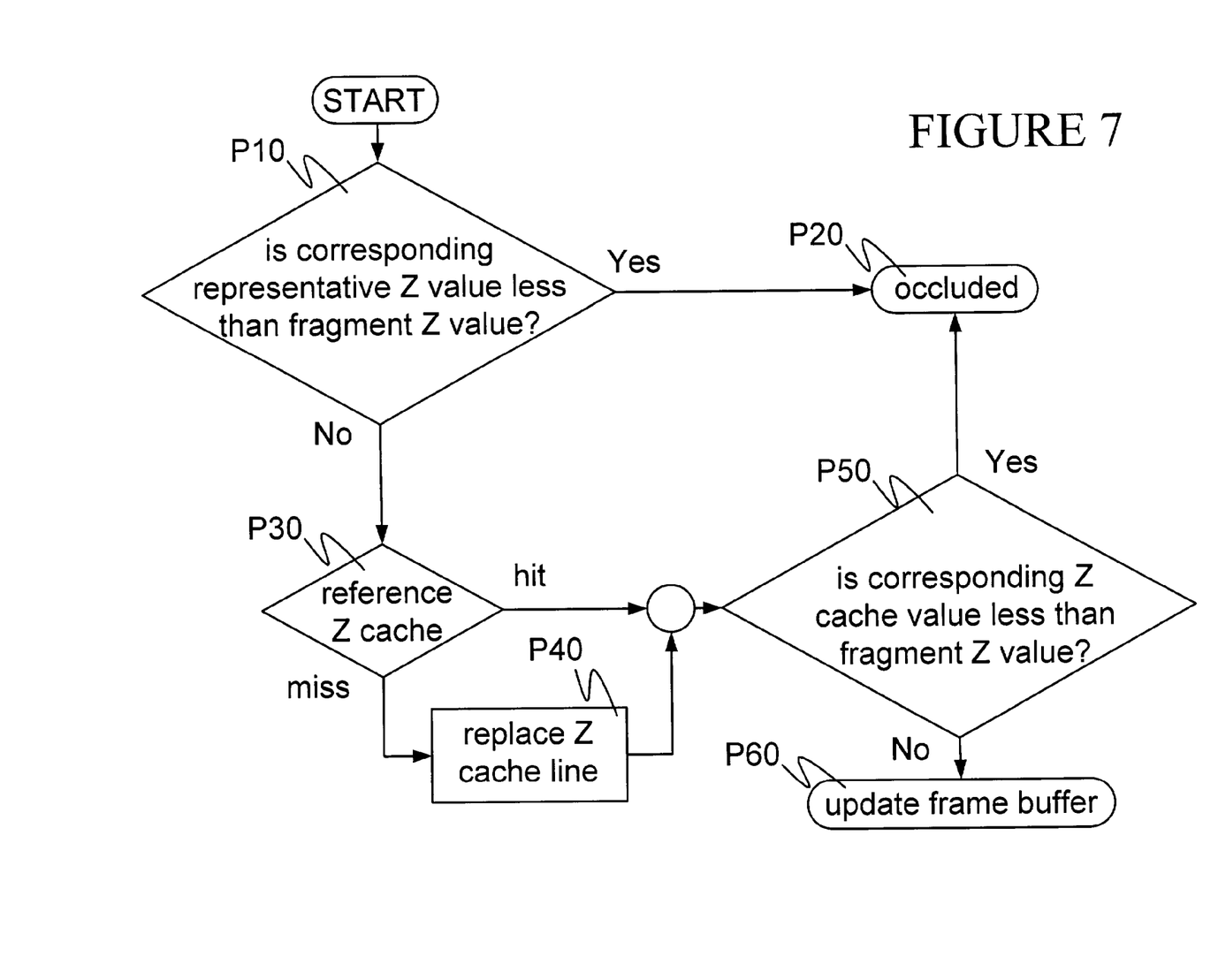
FIG. 7 shows a flowchart of a method of occlusion testing.

FIG. 7 shows a flowchart for a Z test that uses a storage system as shown in FIG. 6. Task P10 compares the fragment Z value to a corresponding value from representative Z value memory 180. If the representative Z value is less, the fragment is occluded and the test ends in task P20. Even if this occlusion test fails, however, the fragment may still be occluded, as this test is conservative. In this case, task P30 references Z cache 185. If a corresponding Z value is not found in the Z cache (i.e. a cache miss occurs), task P40 replaces a line of Z cache 185 (e.g. selected according to a predetermined cache replacement policy) with a line from Z buffer 150 that includes the corresponding Z value. Task P50 compares the fragment Z value to a corresponding value from Z cache 185. If the cached Z value is less, the fragment is occluded and the test ends in task P20. Otherwise, task P60 updates the frame buffer. In some implementations, updating the frame buffer may also be contingent on one or more other tests (such as an alpha test).

Figure 8:
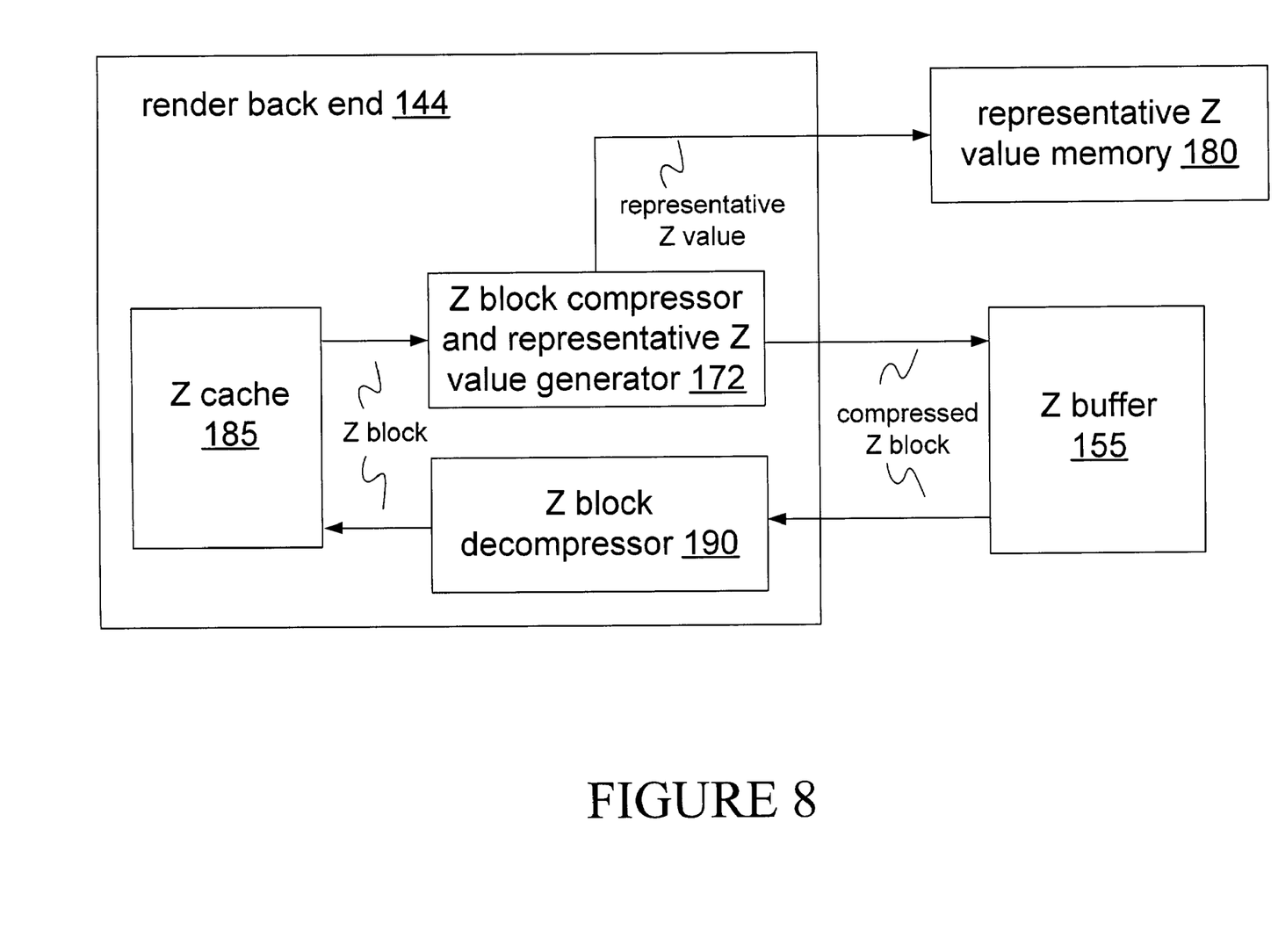
FIG. 8 shows a block diagram of a Z value storage system.

FIG. 8 shows a block diagram of an alternate Z value storage system of a 3D graphics architecture. In this system, Z value traffic between render back end 144 and Z buffer 155 is compressed. Such compression may help to reduce memory bandwidth usage and/or to reduce the storage size of the Z buffer. When a cache miss occurs, the Z block selected for replacement is compressed by Z value compressor 172 before being written back to Z buffer 155. Compressor 172 also determines a representative Z value for the block (e.g. the backmost Z value) and updates a corresponding location of representative Z value memory 180.

It may be desirable in Z value storage systems as shown in FIGS. 6 and 8 to reduce the size of representative Z value memory 180 (e.g. to increase the amount of available chip area). In a naive approach, representative values from several Z blocks may be combined into a single combined representative value by storing only the backmost value. This combined value may then be used in place of the representative Z values in an occlusion test (e.g. task P10 as shown in FIG. 7) on a fragment corresponding to a pixel within any of the constituent blocks. Unfortunately, such a combined value cannot be updated using a representative Z value obtained from any single Z block, as the block may not include the pixel that establishes the current backmost value over the constituent blocks.

In Z value storage systems as shown in FIGS. 6 and 8, the minimum size of representative Z value memory 180 is determined by (and is inversely proportional to) the size of the lines of Z cache 185. In other words, if representative Z value memory 180 is to be made smaller, the sizes of the blocks cached in each line of Z cache 185 must be made larger. However, increasing the cache line size requires increasing the cache size and/or reducing the total number of cache lines. Moreover, larger cache lines may also lead to a higher peak memory bus use (e.g. during servicing of a cache miss) and/or an increased average coherency lag between the Z cache and the Z buffer.

Additionally, a larger cache line size corresponds to a loss of granularity. For example, replacement of a 64-pixel cacheline brings in four times as much data as replacement of a 16-pixel cacheline. For an application in which only one pixel is needed in that cacheline, the efficiency of the 64-pixel cacheline implementation is four times lower. An additional penalty (in terms of cost in, e.g., hardware area) may result when additional operations are performed upon cache line replacement (for example, obtaining one or more representative values from the line being replaced). For one or more of these reasons, increasing the cache line size may be undesirable.

Figure 9:
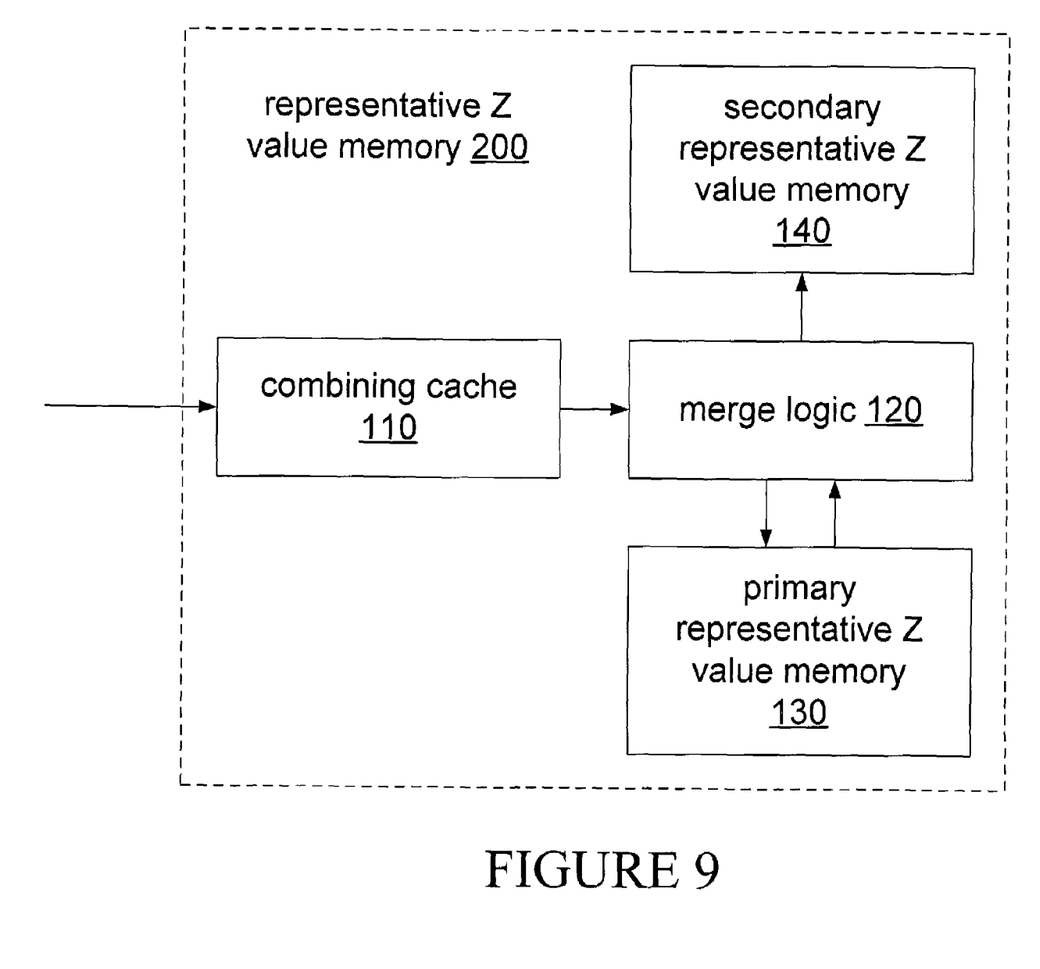
FIG. 9 shows a representative Z value memory according to an embodiment of the invention.

FIG. 9 shows a block diagram of a representative Z value memory 200 according to an embodiment of the invention. In an exemplary application, a memory implemented according to FIG. 9 may be used in place of representative Z value memory 180 in a Z value storage system as shown in FIG. 6 or 8.

Figure 10:
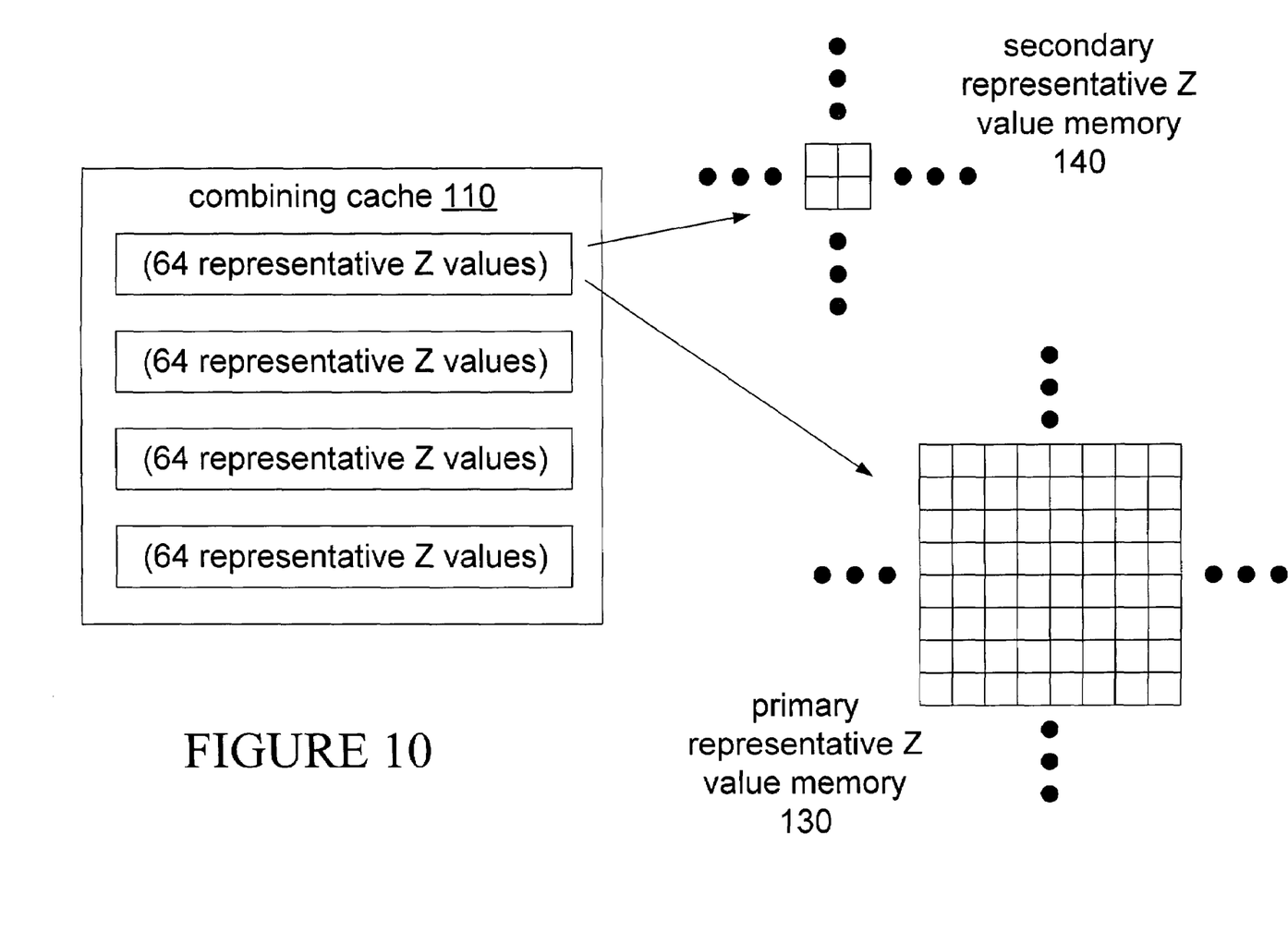
FIG. 10 shows a correspondence between lines of combining cache 110 and blocks of primary representative Z value memory 130 and secondary representative Z value memory 140.

Combining cache 110 stores representative Z values (received, for example, from generator 170 or 172). In an exemplary implementation, combining cache 110 includes cache lines that correspond to blocks of primary representative Z value memory 130. FIG. 10 illustrates an example in which combining cache 110 includes four cache lines, each line storing 64 representative Z values and corresponding to an 8×8 block of values of primary representative Z value memory 130. In one example, the entries of combining cache 110 are initialized to the maximum (i.e. most distant) Z value supported by the implementation. Other possible initial values include (1) the backmost among the block of values of primary representative Z value memory 130 that corresponds to the cache line and (2) the maximum among the values of primary representative Z value memory 130.

When a write miss to combining cache 110 occurs (i.e. the corresponding block of representative Z value memory 130 is not currently cached by combining cache 110), a cache line is selected for replacement and forwarded to merge logic 120. Merge logic 120 determines one or more backmost values of the cache line and updates corresponding locations of secondary representative Z value memory 140. In the example of FIG. 10, merge logic 120 determines four backmost values from each 64-value cache line: one from each of the four 4×4-value blocks in the cached 8×8-value block of representative Z values.

Figure 13A:
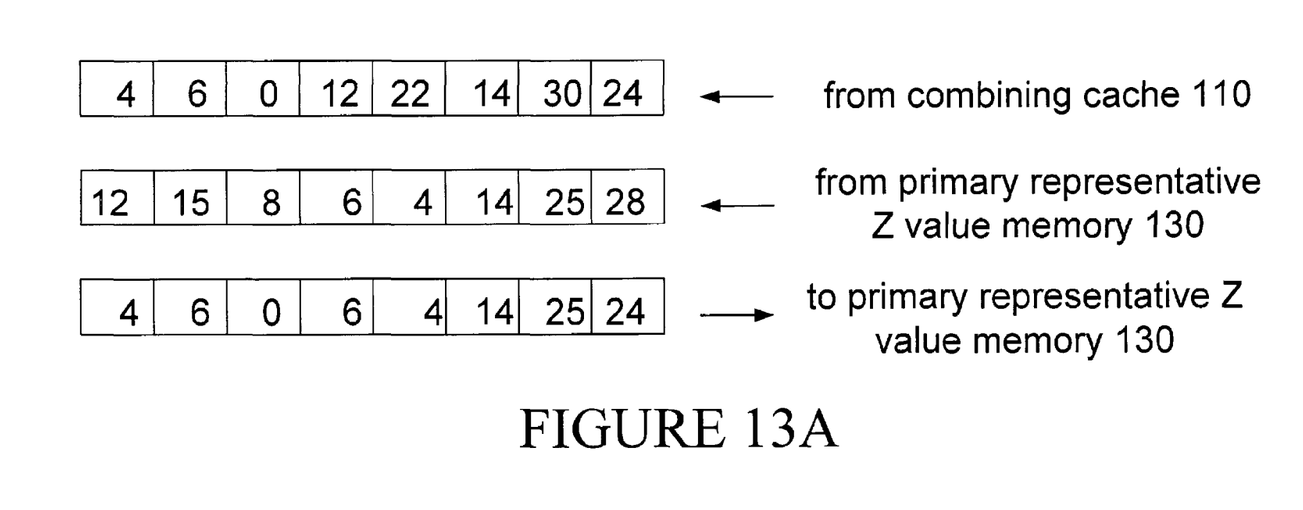
FIGS. 13A and 13B illustrate examples of blocks of values used to update primary representative Z value memory 130.
Figure 13B:
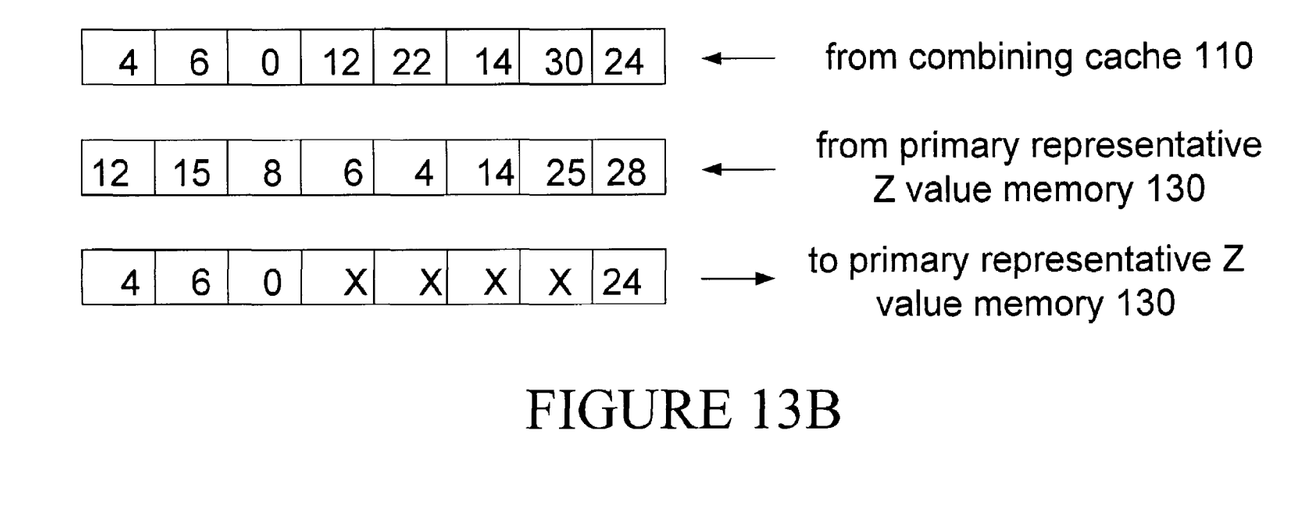

Additionally, merge logic 120 updates the contents of primary representative Z memory 130. In an exemplary implementation, merge logic 120 retrieves the corresponding block from primary representative Z value memory 130, compares each value of the block with the corresponding value of the cache line being replaced, and writes back the minimum value of each pair. FIG. 13 illustrates two examples of updating primary representative Z value memory 130 (a block having eight values is assumed). In the example of FIG. 13A, the block written back to primary representative Z value memory 130 includes the minimum of each pair of values from combining cache 110 and memory 130. In the example of FIG. 13B, only the locations of primary representative Z value memory 130 that have values greater than the corresponding values of combining cache 110 are updated.

Merge logic 120 may be implemented as one or more logic circuits. For example, merge logic 120 may be implemented as or within one or more arrays of logic elements (e.g. gates) such as a microprocessor or microcontroller, an application-specific integrated circuit (ASIC), or a fieldprogrammable gate array (FPGA). Alternatively, merge logic 120 may be implemented as one or more sequences of instructions executable on such a logic circuit or circuits. In such cases, circuits or sequences of instructions for performing tests as described herein (e.g. occlusion and alpha tests) and/or for controlling other operations (e.g. caching and other storage operations) may also be implemented within and/or executable on the same unit or units.

Storage portions of units such as combining cache 110, primary representative Z value memory 130, and secondary representative Z value memory 140 may be implemented in semiconductor or ferroelectric random-access memory. Such memory may be located on the same chip (e.g. as embedded SRAM or DRAM) or within the same module as other elements of the representative Z value memory and/or may be located externally to such elements.

Figure 11:
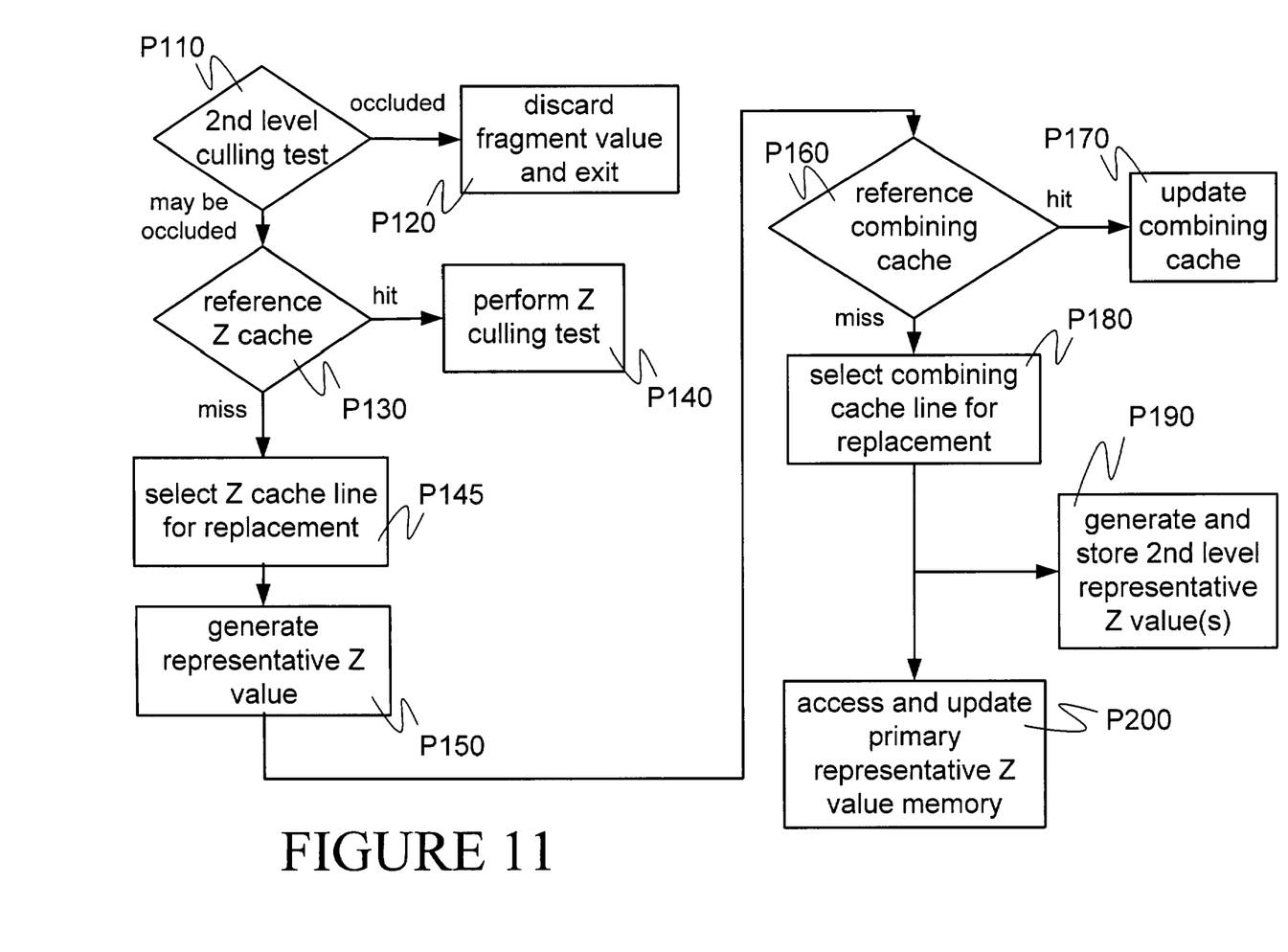
FIG. 11 shows a flowchart of a method according to an embodiment of the invention.

FIG. 11 shows a flowchart for a method according to an embodiment of the invention. Task P110 compares the fragment Z value to a corresponding value from secondary representative Z value memory 140. If the representative Z value is less, the fragment is occluded and the test ends in task P120. Even if this occlusion test fails, however, the fragment may still be occluded, as this test is conservative. In this case, task P130 references Z cache 185. If a corresponding Z value is found (i.e. a cache hit occurs), task P140 compares the fragment Z value to this value, and the fragment is discarded or the frame buffer is updated as appropriate.

If a corresponding value is not found in the Z cache (i.e. a cache miss occurs), task P145 selects a line of Z cache 185 for replacement (e.g. according to a predetermined cache replacement policy). If Z cache 185 is direct-mapped, no replacement policy is necessary. If Z cache 185 is at least partially associative, any suitable replacement policy may be used (e.g. least recently used, first-in-first-out). Task P150 generates a representative Z value from the cache line being replaced, and task P160 references combining cache 110 to store the generated value.

If the corresponding block of representative Z values is cached, task P170 updates the combining cache entry. Otherwise, task P180 selects a line of combining cache 110 for replacement). If combining cache 110 is direct-mapped, no replacement policy is necessary. If combining cache 110 is at least partially associative, any suitable replacement policy may be used (e.g. least recently used, first-in-first-out). In a further implementation, a counter or other timer may be associated with combining cache 110 to trigger flushing of a valid cache line at least once during every time period of predetermined duration (e.g. once every sixty-four processor clock cycles). Task P190 generates one or more representative Z values from the cache line being replaced and updates the corresponding locations of secondary representative Z value memory 140, and task P200 updates the contents of primary representative Z value memory 130 as may be necessary.

Figure 12:
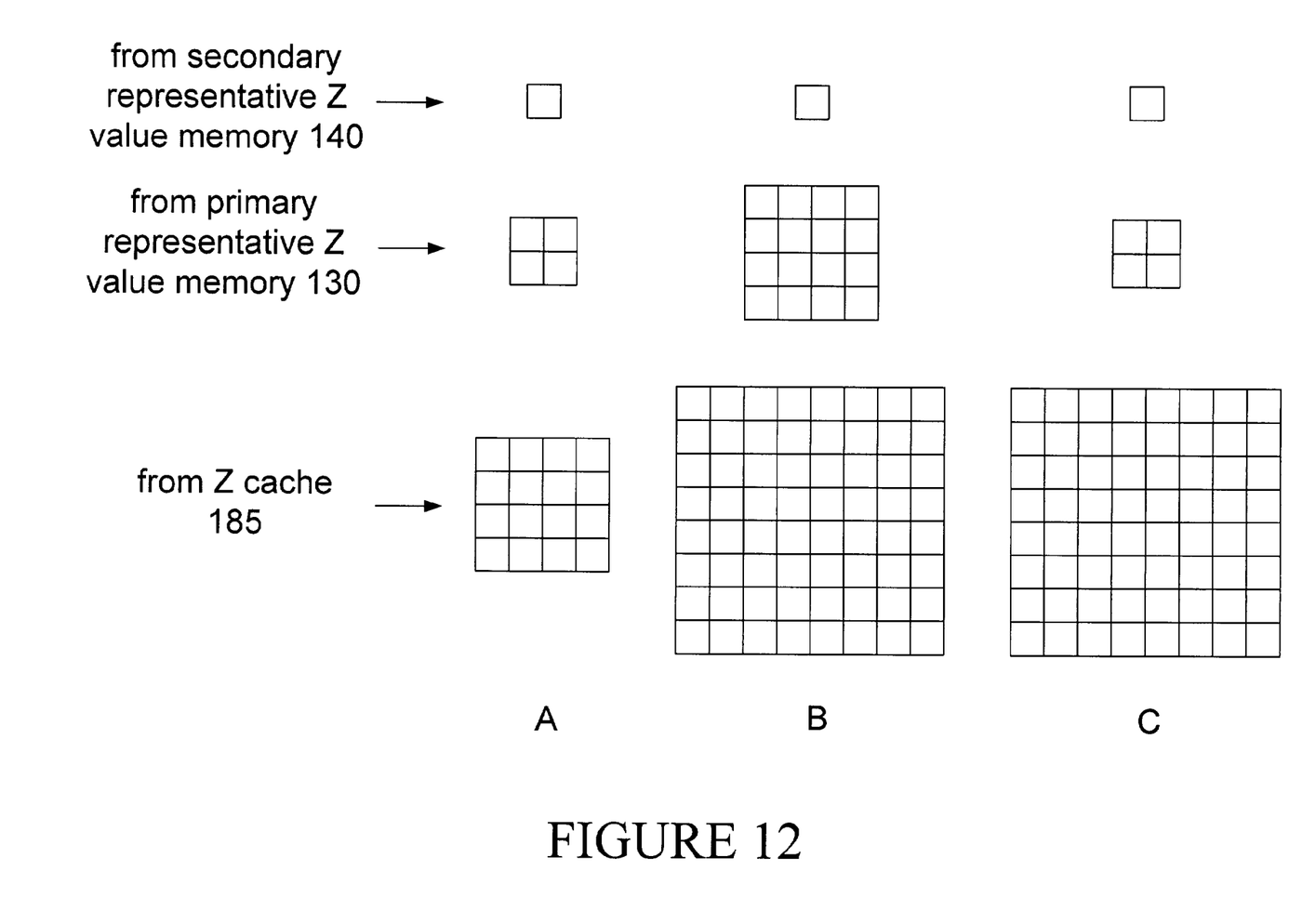
FIG. 12 shows three exemplary correspondences between a value of secondary representative Z value memory 140 and blocks of combining cache 110 and primary representative Z value memory 130.

FIG. 12 shows three examples of areas of correspondence between secondary representative Z value memory 140, primary representative Z value memory 130, and Z cache 185. In example A, each value of secondary representative Z value memory 140 corresponds to a 4×4-value block of Z cache 185 and a 2×2-value block of primary representative Z value memory 130. In example B, each value of secondary representative Z value memory 140 corresponds to an 8×8-value block of Z cache 185 and a 4×4-value block of primary representative Z value memory 130. In example C, each value of secondary representative Z value memory 140 corresponds to an 8×8-value block of Z cache 185 and a 2×2-value block of primary representative Z value memory 130. Although it may be convenient and/or efficient in some applications to implement such correspondences in powers of two (e.g. as shown in FIG. 12), practice of the invention is not limited to such relations, and adjacent levels of storage may be related in any other square (e.g. 3×3) or non-square (e.g. 3×4) manner.

A representative Z value memory (e.g. as described in co-pending U.S. patent application Ser. No. 09/140,930 referenced above) may be used to support culling on an object-element (i.e. polygon) level. A secondary representative Z value memory as described herein may be used to exploit an even higher level of spatial coherency in the image being rendered. Because a single value of secondary representative Z value memory 140 may correspond to many or even all of the pixels in an object, the complexity of culling tests associated with rendering the object may be reduced significantly.

In a method as shown in FIG. 11, primary representative Z value memory 130 is used only to support updating of secondary representative Z value memory 140 and is not directly referenced for occlusion testing. In a method according to a alternate embodiment of the invention, primary representative Z value memory 130 is also used for occlusion testing. In one such example, failure of the occlusion test of task P110 leads to an occlusion test against a corresponding value of primary representative Z value memory 130 (e.g. according to task P10 described above), and Z cache 185 is referenced only if that test fails as well.

Implementation of a reduced-resolution representative Z value memory as described herein may also be used to support culling decisions before the graphics primitives are forwarded to the 3D graphics architecture for rendering (e.g. during modeling). For example, task P190 may be expanded to include updating a copy of secondary representative Z value memory 140 that is accessible to the software application which generates the graphics primitives. In one such application, the software application generates a bounding box that surrounds a set of polygons and performs an occlusion test of the bounding box with reference to the local copy of secondary representative Z value memory 140. If the application determines that the bounding box is occluded, the set of polygons is not forwarded to the rendering hardware.

In a further example, a copy of a representative Z value memory 180 that is accessible to the modeling software application is maintained. As representative Z value memory 180 is updated, copies of the new values are stored (e.g. within the render back end) and forwarded to update the copy as memory bus bandwidth is available. In another implementation, the copy is not updated if bandwidth is not available when the new values are generated. Because the copy is updated only as bandwidth is available, occlusion testing by the modeling software may be more conservative that representative Z value memory 180 would allow.

In a further implementation, a reduced copy of a representative Z value memory 180 that is accessible to the modeling software application is maintained. As updates to representative Z value memory 180 occur, a backmost value is determined for two or more blocks of representative Z value memory 180 and forwarded to update the reduced copy. As described above, construction and/or updating of the reduced copy may occur based on the availability of memory bandwidth.

The foregoing presentation of the described embodiments is provided to enable any person skilled in the art to make or use the present invention. Various modifications to these embodiments are possible, and the generic principle of a hierarchical data scheme presented herein may be applied to other embodiments as well.

For example, the invention may be implemented in part or in whole as a hard-wired circuit or as a circuit configuration fabricated into an application-specific integrated circuit. In such cases, the invention may be implemented, e.g., within a chip or a multi-chip module, within an assembly such as a peripheral for connection to a computer (e.g. an expansion card for insertion into an internal slot of a computer), within a computer mainboard, or within a combination of such elements (e.g. a combination of a computer mainboard and an expansion card).

The invention may also be implemented in part or in whole as a firmware program loaded into non-volatile storage or a software program loaded from or into a data storage medium (e.g. a semiconductor or ferroelectric (e.g. magnetoresistive) memory unit (such as ROM, PROM, SRAM, DRAM, flash, or embedded) or a magnetic or phase-change medium such as a disk (such as floppy, hard, CD or DVD ROM or RAM)) as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of data processing, said method comprising:
   selecting a line of a Z cache, the line having a first resolution corresponding to a resolution of a frame buffer;
   generating a first-level representative Z value from the selected line of the Z cache; and
   selecting, from among the lines of a cache of representative Z values, a line that corresponds to the first-level representative Z value, the line having a second resolution coarser than the first resolution.

2. The method of data processing according to claim 1, said method comprising:
   selecting a backmost value from among the selected line of a cache of representative Z values; and
   updating a primary representative Z value memory based on the selected line of a cache of representative Z values.

3. The method of data processing according to claim 2, said method comprising, based on the selected backmost value, updating a corresponding one of a plurality of second-level representative Z values of a secondary representative Z value memory.

4. The method of data processing according to claim 1, said method comprising storing the generated first-level representative Z value to a primary representative Z value memory upon a write miss to the cache of representative Z values.

5. A data storage medium having machine-readable code stored thereon, the machine-readable code comprising instructions executable by an array of logic elements, the instructions defining the method according to claim 1.

6. The method of data processing according to claim 1, wherein said selecting, according to the first-level representative Z value, a line of a cache of representative Z values comprises selecting, from among the lines of the cache of representative Z values, a line that corresponds to the first-level representative Z value.

7. A data processing apparatus, said apparatus comprising:
   a Z cache configured to store a plurality of cache lines of Z values, each of the plurality of cache lines having a first resolution corresponding to a resolution of a frame buffer;
   a representative Z value generator configured to generate a first-level representative Z value from a selected cache line of the Z cache; and
   a combining cache configured to store a plurality of cache lines of first-level representative Z values, each of the plurality of cache lines having a second resolution coarser than the first resolution, and to select, from among the plurality of cache lines of first-level representative Z values, a cache line that corresponds to the generated first-level representative Z value.

8. The data processing apparatus according to claim 7, said apparatus comprising:
   a primary representative Z value memory configured to store first-level representative Z values; and
   a logic circuit configured to receive the selected one of the plurality of cache lines of first-level representative Z values and to compare the values of this cache line with corresponding first-level representative Z values from the primary representative Z value memory,
   wherein said logic circuit is configured to determine a second-level representative Z value from the selected one of the plurality of cache lines of first-level representative Z values.

9. The data processing apparatus of claim 7, said apparatus comprising a logic circuit configured to determine a second-level representative Z value as a backmost value among the first plurality of first-level representative Z values.

10. The data processing apparatus according to claim 7, said apparatus comprising a secondary representative Z value memory configured to store a plurality of second-level representative Z values, wherein said logic circuit is configured to update a corresponding value of the secondary representative Z value memory with the determined second-level representative Z value.

11. The data processing apparatus according to claim 8, wherein said logic circuit is configured to write back the minimum value of each said comparison of first-level representative Z values to the primary representative Z value memory.

12. The data processing apparatus of claim 8, wherein said apparatus is configured to compare a fragment Z value with the determined second-level representative Z value.

13. The data processing apparatus of claim 7, wherein said apparatus is configured to generate the first-level representative Z value as the backmost among values of the selected line.

14. The data processing apparatus according to claim 7, wherein said representative Z value generator is configured to compress the Z values of the selected cache line of the Z cache and to write the compressed Z values to a Z buffer having the first resolution.

15. The data processing apparatus of claim 7, wherein said combining cache is configured to select one of the plurality of cache lines of first-level representative Z values according to the generated first-level representative Z value by selecting a cache line, from among the plurality of cache lines of first-level representative Z values, that corresponds to the generated first-level representative Z value.

16. A method of data processing, said method comprising:
selecting one from among a plurality of cache lines of a first cache of Z values, each of the plurality of cache lines having a first resolution corresponding to a resolution of a frame buffer,
selecting a backmost Z value from among the Z values of the selected cache line of the first cache; and
selecting, from among a plurality of cache lines of a second cache of Z values, a cache line that corresponds to the backmost Z value, each of the plurality of cache lines of the second cache of Z values having a second resolution coarser than the first resolution.

17. The method of data processing according to claim 16, wherein the selected cache line of the first cache includes a block of values corresponding to a pixel block of a display frame.

18. The method of data processing according to claim 16, wherein the selected cache line of the first cache includes a block of values corresponding to a contiguous block of pixels of a display frame.

19. The method of data processing according to claim 16, wherein the selected cache line of the second cache is mapped to a region of a display frame that includes a pixel block corresponding to the backmost Z value.

20. The method of data processing according to claim 16, said method comprising selecting a backmost value from each of a plurality of blocks in the selected cache line of the second cache.

21. The method of data processing according to claim 20, said method comprising comparing a fragment Z value with one of the selected backmost values of the selected cache line of the second cache.

22. The method of data processing according to claim 20, said method comprising, based on at least one value of the selected backmost values of the selected cache line of the second cache, updating a memory accessible to a modeling software application.

23. The method of data processing according to claim 16, said method comprising:
compressing the Z values of the selected cache line of the first cache; and
writing the compressed Z values to a Z buffer having the first resolution.

24. The method of data processing according to claim 16, said method comprising:
comparing the Z values of the selected cache line of the second cache with corresponding values from a memory having the second resolution, and
writing back the minimum value of each said comparison to the memory.

25. A data storage medium having machine-readable code stored thereon, the machine-readable code comprising instructions executable by an array of logic elements, the instructions defining the method according to claim 16.

26. The method of data processing according to claim 16, wherein said selecting, according to the backmost Z value, one from among a plurality of cache lines of a second cache of Z values comprises selecting, from among the plurality of cache lines of the second cache of Z values, a cache line that corresponds to the backmost Z value.

* * * * *